United States Patent
Matsuoka et al.

[11] Patent Number: 5,154,614
[45] Date of Patent: Oct. 13, 1992

[54] SOUND OUTPUT ELECTRONIC APPARATUS

[75] Inventors: Mikiharu Matsuoka, Tokyo; Yasuko Miyazaki; Shinichi Tenno, both of Yokohama, all of Japan

[73] Assignee: Canon Kabushiki Kaisha, Tokyo, Japan

[21] Appl. No.: 669,187

[22] Filed: Mar. 13, 1991

[30] Foreign Application Priority Data

Mar. 13, 1990 [JP] Japan ................... 2-59853
Mar. 13, 1990 [JP] Japan ................... 2-59854

[51] Int. Cl.⁵ ................................. G09B 21/00
[52] U.S. Cl. ........................... 434/112; 434/169
[58] Field of Search ............. 434/113, 114, 116, 112, 434/169

[56] References Cited

U.S. PATENT DOCUMENTS

| | | | |
|---|---|---|---|
| 3,255,537 | 6/1966 | Cole et al. | 434/113 |
| 3,341,950 | 9/1967 | Reader | 434/116 |
| 3,371,321 | 2/1968 | Adams | 434/169 X |
| 3,628,257 | 12/1971 | Budrose | 434/116 |
| 3,851,745 | 12/1974 | Okazaki et al. | 434/114 |
| 3,883,146 | 5/1975 | Johnson et al. | 434/116 |
| 4,507,088 | 3/1985 | Wilson | 434/112 |
| 4,694,494 | 9/1987 | Woolfson | 381/51 |
| 4,831,218 | 5/1989 | Wright | 200/5 A |
| 4,875,185 | 10/1989 | Bornachoin | 364/900 |
| 4,881,900 | 11/1989 | Matsuoka et al. | 434/113 |
| 4,985,692 | 1/1991 | Breider et al. | 340/407 |

FOREIGN PATENT DOCUMENTS

| | | | |
|---|---|---|---|
| 249920 | 12/1987 | European Pat. Off. | 434/117 |
| 3527065 | 2/1987 | Fed. Rep. of Germany | 434/117 |

Primary Examiner—Richard J. Apley
Assistant Examiner—Karen A. Richard
Attorney, Agent, or Firm—Fitzpatrick, Cella, Harper & Scinto

[57] ABSTRACT

A sound output electronic apparatus includes: a key input corresponding to elements of a predetermined braille pattern; a memory for storing braille data which was input from the key input; and a device for generating the input data stored in the memory as sounds. The data of the braille data which was input and stored can be recognized by sound the information. Also provided is a comparator for comparing the input data which was input from the key input and the input data stored in the memory and generator for generating information indicative of the result of the comparison by the comparator as sound information. The braille data which is being input is compared with the braille data stored to see if they coincide or not. The comparison result can be recognized by a sound output.

4 Claims, 8 Drawing Sheets

("a")

("i")

SOUND OUTPUT ELECTRONIC APPARATUS

BACKGROUND OF THE INVENTION

1. Field of the Invention

The present invention relates to an electronic apparatus and, more particularly, to an electronic apparatus which has key input means corresponding to each element of a predetermined braille pattern and stores and inputs or outputs information which was input from the key input means.

2. Related Background Art

Hitherto, when a blind person makes a note, he uses a braille typewriter or a braille word processor with a braille display such that input information can be recognized.

However, in the above conventional braille, typewriter or braille word processor, a portability is poor and it is very inconvenient to use such an apparatus outdoors.

Although portability is improved by removing the braille display from the braille word processor. When this is done input information cannot be confirmed.

SUMMARY OF THE INVENTION

It is the first object of the invention to provide an electronic apparatus in which by generating a sound a braille display can be omitted thereby providing an electronic apparatus with high portability and a braille user's interface.

The second object of the invention is to convert braille information which was stored by a key input into a generated buzzer sound.

The third object of the invention is to provide an electronic apparatus in which braille information which is being generated by a key input is compared with braille information stored in memory means and when they coincide, the coincidence can be confirmed by a sound output.

DETAILED DESCRIPTION OF PREFERRED EMBODIMENTS

Figure 1:
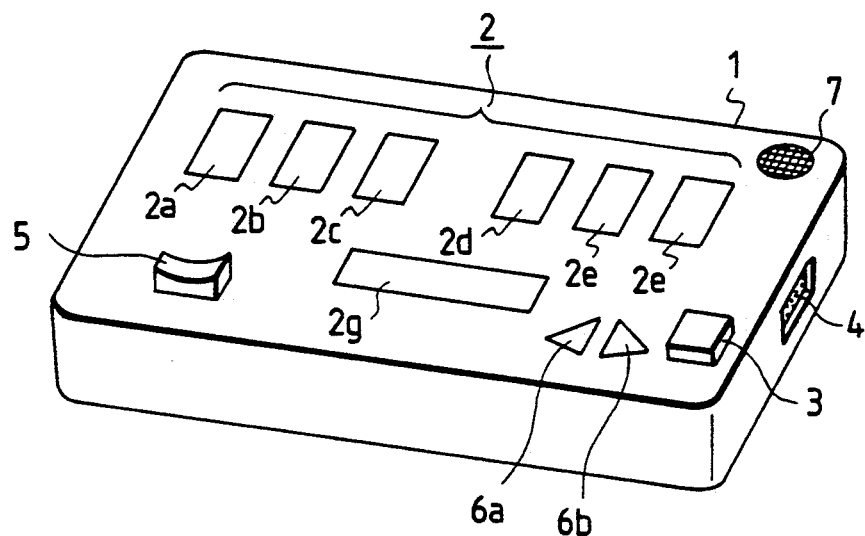
FIG. 1 is a perspective view of an electronic apparatus to which the invention is applied.

The invention will be described in detail hereinbelow on the basis of embodiments shown in the drawings.

FIG. 1 is a perspective view showing a schematic construction of an electronic apparatus to which the invention was applied. In the diagram, reference numeral 1 denotes an apparatus main body; 2a to 2f denote input keys for a braille input; 3 denotes a power switch; 4 denotes an input/output (I/O) interface; 5 denotes a memory switch; 6 denotes a cursor key comprising a forward key 6a and a back key 6b; and 7 denotes a speaker.

An outline of a user's interface of the apparatus of FIG. 1 will be shown hereinbelow.

The relations among the input keys 2a to 2f and the braille pattern will be first described.

Figure 2A:
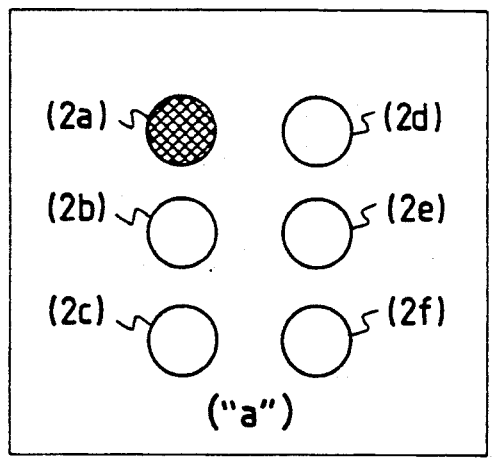
FIGS. 2A and 2B are explanatory diagrams showing the constructions of braille points.
Figure 2B:
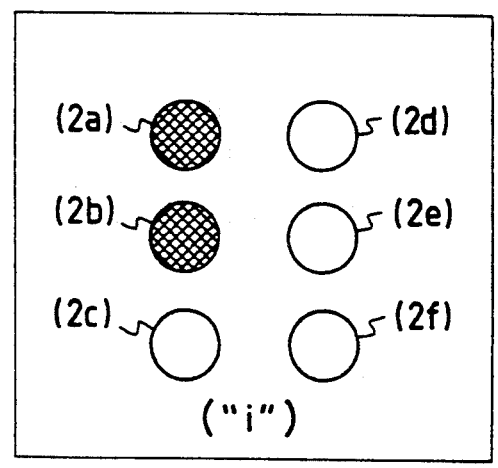

FIG. 2 shows expressions of characters "ρ" (which reads "a") and "τ" (which reads "i") according to braille points.

As is well known, braille expresses a character by a pattern of projections (points) of two columns and three rows as a matrix of vertical and lateral points. In the characters "ρ" and "τ" in FIGS. 2A and 2B, the elements (points) shown by hatched regions are expressed as projections.

The input keys 2a to 2f in FIG. 1 correspond to the elements of six braille points as mentioned above respectively. The corresponding relation between each point and the input key is as shown in the parentheses in FIGS. 2A and 2B. The respective points are rearranged in a predetermined direction.

That is, by depressing the input key 2a, the braille of "ρ" is input. Similarly, by depressing the input keys 2a and 2b, the braille of "τ" is input.

In the apparatus, in the case of continuously inputting, for example, "ρτ", the input key 2a is first pressed and a finger is removed from the input key 2a and both of the input keys 2a and 2b are then simultaneously pressed. By repeating similar operations, a sentence is input.

On the other hand, in the case of making a note by using the electronic apparatus, after the power switch 3 is depressed, the memory switch 5 is inclined to the left to set a memory mode. A file name is input by using the desired input keys 2a to 2f while depressing the space key 2g. The file name has a meaning similar to a data file in a word processor or the like. After the finger is removed from the space key 2g, the sentence is stored every key input into an RAM which was assigned every file name.

If a blind person wants to confirm the character which has already been input during the inputting operation of a sentence, the memory switch 5 is inclined to the right to set a reading mode and the back key 6b is pressed a number of times corresponding to the number of characters until the position of a character to be confirmed is reached.

Assuming that the location of a character to be confirmed is a location of two preceding characters and that the input data corresponding to the input keys 2a and 2c have been stored, the memory switch 5 is first inclined to the right to set the reading mode and, after that, the back key 6b is pressed twice and a search point is returned to data to be confirmed in the RAM.

The input data of the input keys 2a and 2c has been stored in the RAM and is expressed by binary numbers of "101000". In correspondence to the binary numbers, sounds are generated such that "bee, pi, bee, pi, pi, pi" (that is, "bee" corresponds to the binary number "1" and "pi" corresponds to the binary number "0"). The blind person can confirm the input data by listening to such sounds. To change the data, the memory switch 5 is inclined to the left to set the memory mode and a key input is again executed.

The case of generating the content of the RAM through the I/O interface 4 will now be described. In this case, the memory switch 5 is set to the reading mode and a desired file name to be generated is input by the input keys 2a to 2f while depressing the space key 2g.

After the keys were released, the data in the RAM corresponding to the input file name is generated from the I/O interface 4. The content of the data can be again read by connecting the I/O interface 4 to a braille display, a braille word processor with a braille display, or the like.

An internal circuit of the apparatus to realize the interface as mentioned above will now be described.

Figure 3:
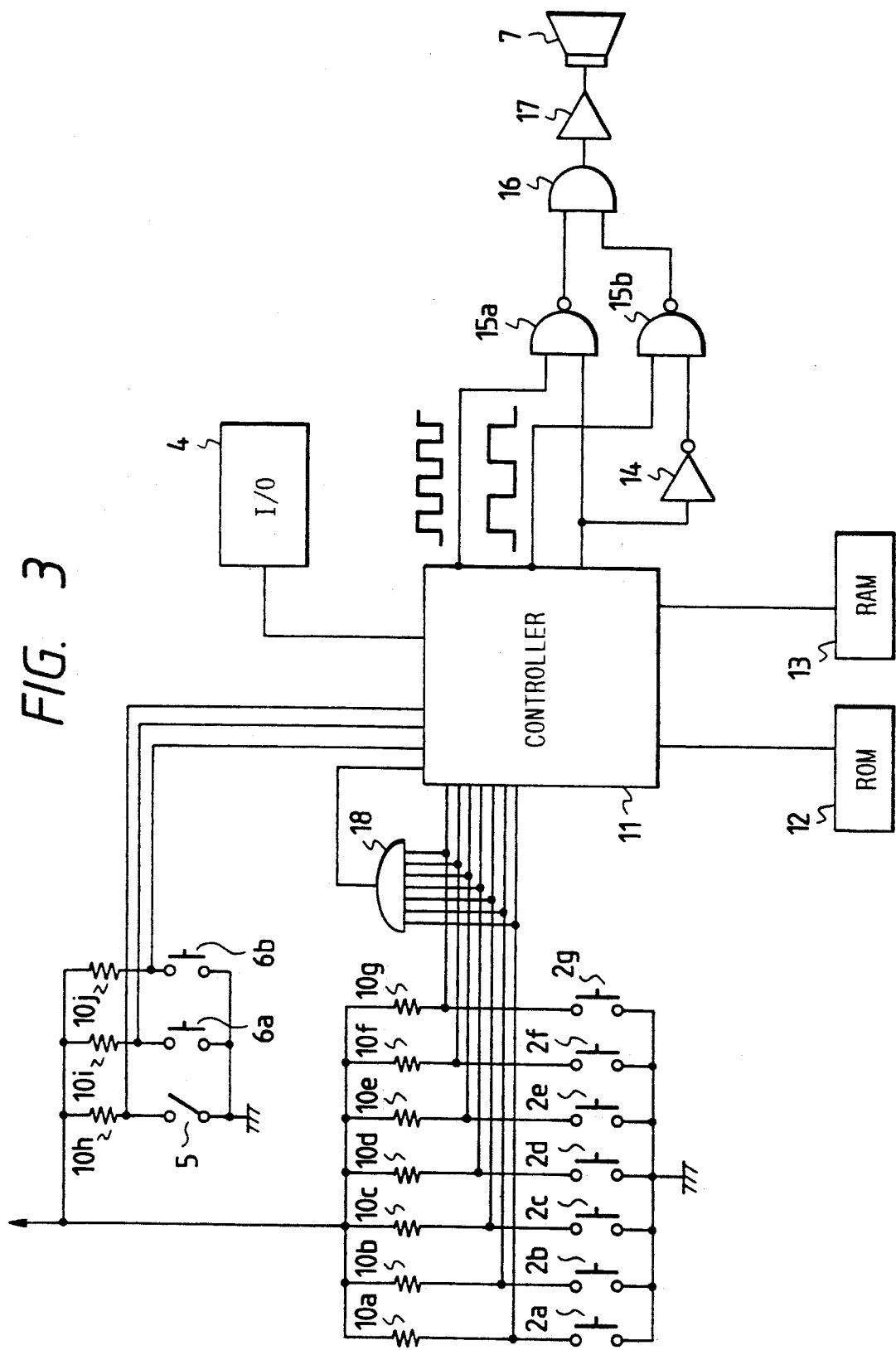
FIG. 3 is a block diagram of a control system using the first embodiment of the invention in a construction of the apparatus of FIG. 1.

FIG. 3 is a block diagram according to the first embodiment of the invention showing the construction of the apparatus of FIG. 1.

A control section of the apparatus comprises a controller 11 which is constructed by a one-chip microprocessor or the like. Outputs of the keys in FIG. 1 are supplied to the controller 11.

The input keys 2a to 2f and the space key 2g are suspended by pull-up resistors 10a to 10g. A signal indicative of "0" or "1" is supplied to the controller 11 in accordance with the presence or absence of the key depression.

Reference numeral 18 denotes a 7-input AND gate to generate signals to inform data reading timings to the controller. The controller reads the data at a timing after the lapse of hundreds of msec from a time point in time when an output of the 7-input AND gate 18 was changed from "1" to "0".

The memory switch 5, forward key 6a, and back key 6b have also similarly been pulled up. Data of "1" or "0" is sent to the controller and used to discriminate the operating mode and to move a cursor.

Reference numeral 12 denotes an ROM. A program which is used in the controller, which will be explained later, is stored in the ROM 12. Reference numeral 13 indicates an RAM. The key input data is stored in or extracted from the RAM 13 in accordance with the key operation.

The I/O interface 4 is used to supply the data in the RAM 13 to the outside. Reference numeral 14 denotes an inverter; 15a and 15b denote NAND gates; 16 denotes an AND gate; 17 denotes an amplifier; and 7 denotes the speaker to generate and express the content of the RAM 13 by a high or low tone of the sound.

The data which was read out of the RAM 13 is stored in a shift register in the controller and is sequentially supplied to the NAND gate 15a or to the NAND gate 15b through the inverter 14.

Pulses of a different frequency to drive the speaker 7 are supplied to the other terminals of the NAND gates 15a and 15b. When the data in the shift register is set to "1", the NAND gate 15a and the AND gate 16 are turned on, so that a sound of a high tone is generated. On the contrary, when the data in the shift register is set to "0", a sound of a low tone is generated via the NAND gate 15b and the AND gate 16.

As mentioned above, different sounds of a high tone and a low tone can be generated depending on whether the data to be confirmed in the RAM 13 is equal to "1" or "0".

The operation in the above construction will now be described with reference to flow charts of FIGS. 4 and 5.

Figure 4:
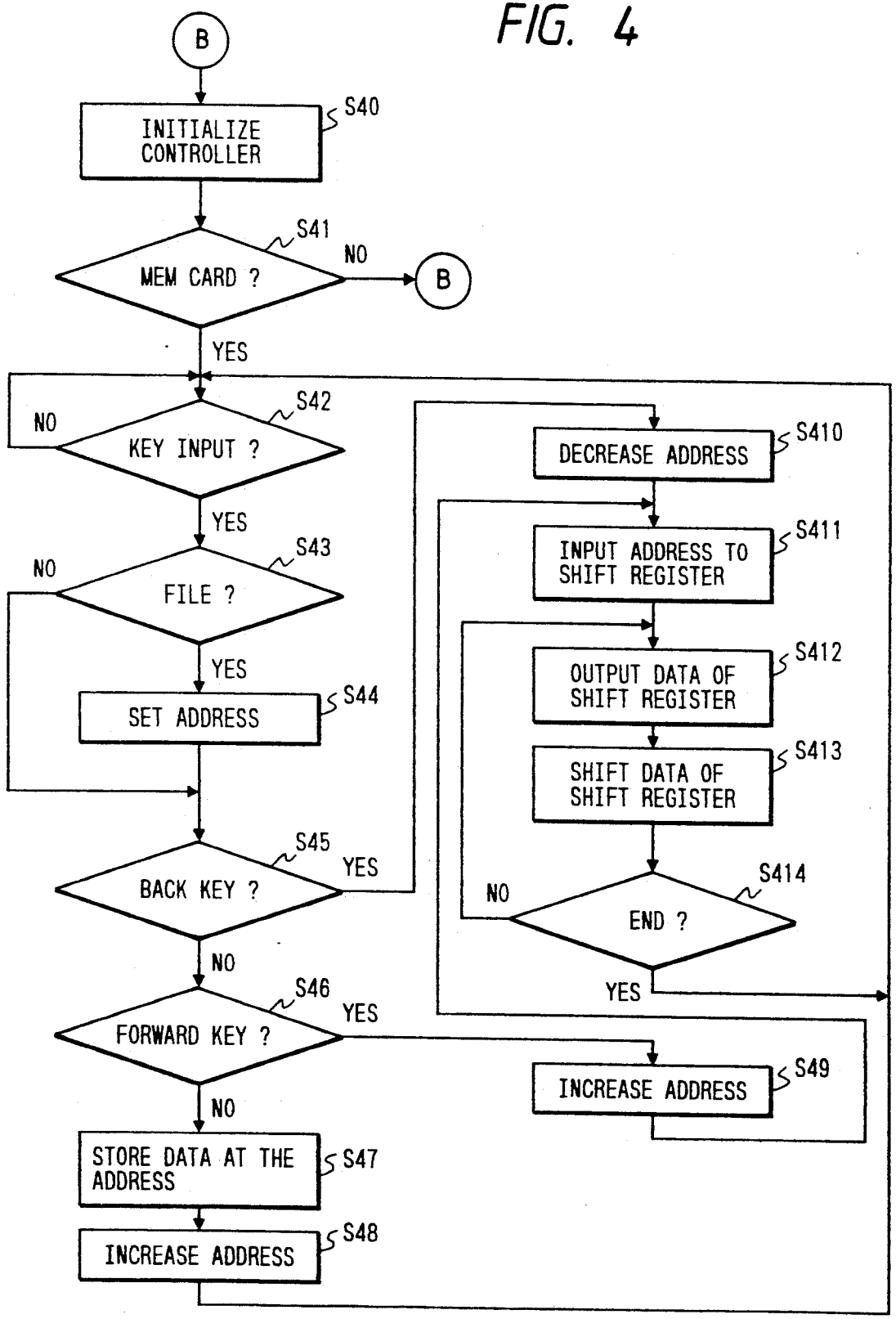
FIG. 4 is a flowchart showing a first control procedure in the construction shown in FIG. 3.

First, when the power source is turned on, the controller is initialized in step S40 in FIG. 4 and, for instance, a port is set and pulses to ring a buzzer are formed. In step S41, a check is made to see if the memory mode has been set or not. The apparatus waits for a key input in step S42. If a key input has been performed, a check is made in step S43 to see if the key input has been made to set a file name or not.

The discrimination in step S43 is performed by checking whether the space key 2g has been simultaneously depressed or not. When the file name is input, an address in the RAM 13 corresponding to the file name is set in step S44. The subsequent key input data is sequentially input from the above address.

If the file name is not input in step S43, this means that the address has already been set, so that step S45 follows.

In steps S45 and S46, the back key 6b and the forward key 6a have been depressed or not. If they have been depressed, the address is increased in step S49 or is decreased in step S410. In step S411, the value of the address in the RAM 13 is loaded into the shift register.

The content of the shift register is generated in step S412, thereby generating a sound of a high or low tone as shown in FIG. 3 mentioned above.

In step S413, the data in the shift register is shifted. Processes of a loop in steps S412, S413, and S414 are executed until the data generation is finished in step S414. After completion of the data generation, the processing routine is returned to step S42.

Figure 5:
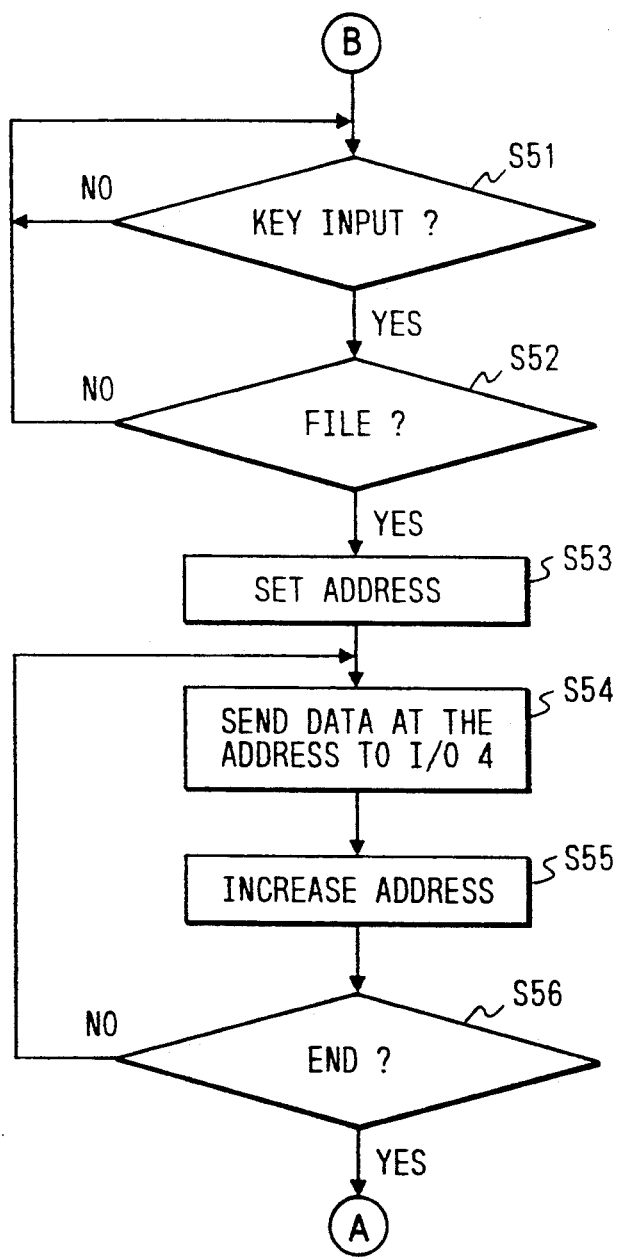
FIG. 5 is a flowchart showing a second control procedure in the construction shown in FIG. 3.

If the reading mode has been set in step S41, the processing routine advances to step S51 in FIG. 5. The processes of a loop in steps S51 and S52 are repeated until the file name is input. If the file name has been input, the address corresponding to the file name is set in step S53. The data is generated to the I/O interface 4 in steps S54, S55, and S56.

As mentioned above, by providing means for generating a sound of a high or low tone in correspondence to the bit "1" or "0" of the binary input data stored in the memory means, the input data can be confirmed without using a braille display.

That is, by providing means for informing the data content to the user by a sound output, there is no need to provide braille display means. The entire apparatus can be decreased in size and weight. A small electronic apparatus having a use efficiency similar to an electronic notebook which is used by a user of a normal eyesight can be provided.

In the above embodiment, the content of the user has been informed of the RAM 13 by a buzzer sound upon confirmation. However, the user be also informed by a synthetic voice sound. The tone of the buzzer sound can be also freely changed by making the pulse width variable.

As will be obviously understood from the above description, according to the first embodiment of the invention, there are provided: the key input means corresponding to each element of a predetermined braille pattern; the memory means for storing braille data which was input from the key input means; and the means for generating the input data stored in the memory means as a sound. Therefore, there is no need to use large, complicated, and expensive braille output means. It is possible to provide an excellent electronic apparatus which has an excellent portability and in which the user can confirm the braille data which was input and stored.

The second embodiment of the invention will now be described.

In FIG. 1 regarding the electronic apparatus of the invention, in the case where the user desires to confirm the character which has already been input during an inputting operation of a sentence in a state in which the memory switch 5 was set to the memory mode, the memory switch 5 is inclined to the right to set the reading mode and the back key 6b is depressed only a number of times corresponding to the number of characters until a location of data to be confirmed in the memory.

Assuming that the location of the data to be confirmed is a position corresponding to two preceding characters from the present input position and that the input data of the input keys 2a and 2c have been stored, the memory switch 5 is first set to the reading mode and the back key 6b is depressed twice and a search position is returned to the data to be confirmed in the RAM.

Then, by sequentially depressing the input keys 2a to 2f, sounds of "pi" are generated when the input key 2a is depressed and when the input key 2c is depressed because the key data of the input keys 2a and 2c have already been stored in the RAM to be confirmed. The blind person can confirm the input data by listening to the sounds. To change the data, the memory switch 5 is set to the memory mode and the key input is again executed.

The case of outputting the content of the RAM through the I/O interface 4 will now be explained. In this case, the memory switch 5 is set to the reading mode and file name to be generated is input by pressing the input keys 2a to 2f while depressing the space key 2g. After the space key was released, the data in the RAM corresponding to the input file name is generated from the I/O interface 4. The data content can be read again by connecting the I/O interface 4 to a braille display, a braille word processor with a braille display, or the like.

An internal circuit of the apparatus to realize the interface as mentioned above will now be described.

Figure 6:
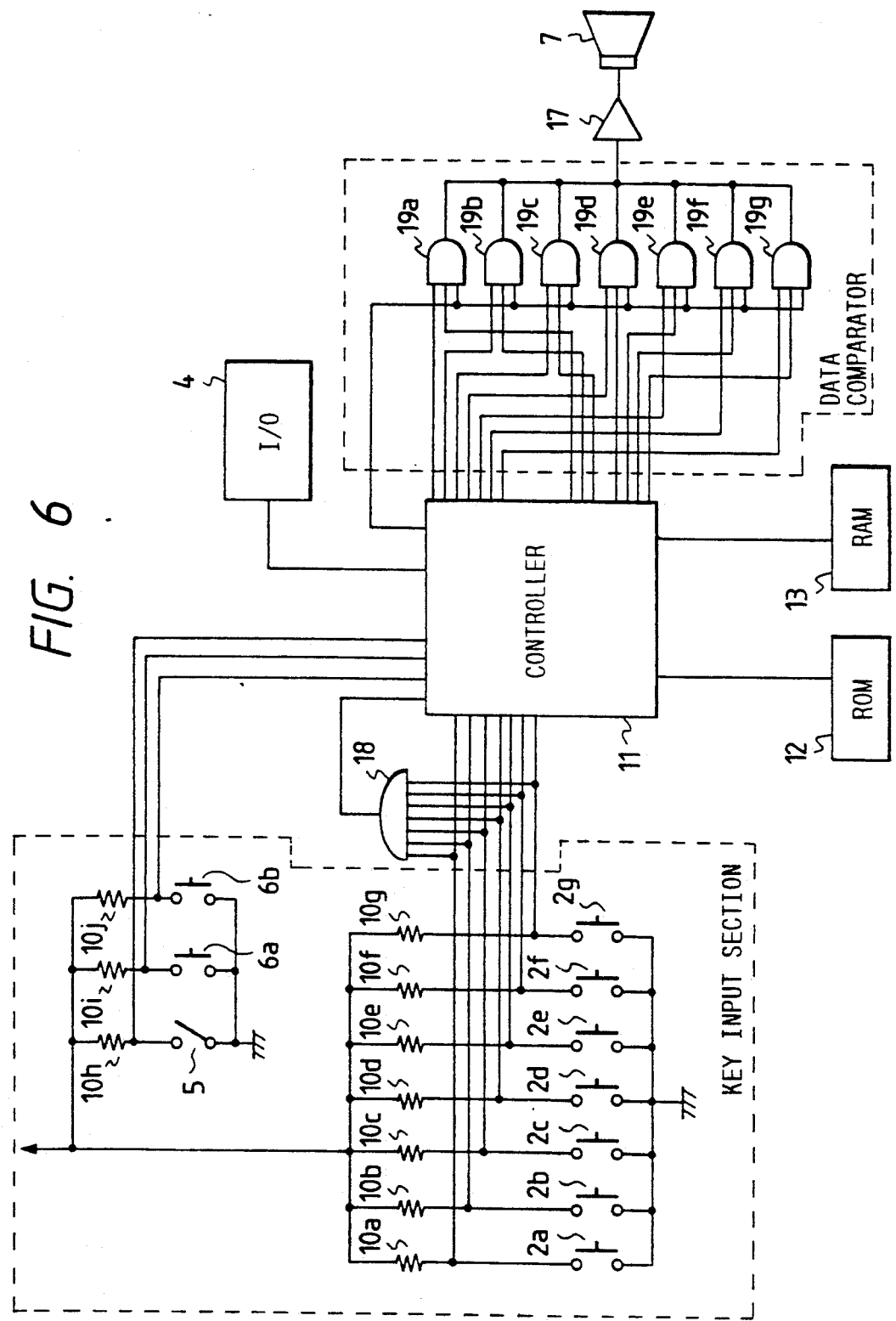
FIG. 6 is a block diagram of a control system using the second embodiment of the invention in the construction of the apparatus of FIG. 1.

FIG. 6 is a block diagram of the second embodiment of the invention showing another construction of the apparatus of FIG. 1. The input keys 2a to 2f and the space key 2g are suspended by the pull-up resistors 10a to 10g. A signal of "0" or "1" is input to the controller in accordance with the presence or absence of the key depression.

Reference numeral 18 denotes the 7-input AND gate to generate signals for informing data reading timings to the controller. The controller reads the data from a timing after the elapse of hundreds of 100 msec from a in time point when outputs of the AND gate 18 were changed from "1" to "0".

The memory switch 5, forward key 6a, and back key 6b have also similarly been pulled up. The data of "1" or "0" is sent to the controller and is used to discriminate the operating mode and to move a cursor.

A software program which is used by the controller has been stored in the ROM 12. The key input data is stored into or read out from the RAM 13 in accordance with the key operations. The I/O interface 4 is used to output the data in the RAM 13 to the outside.

Reference numerals 19a to 19g denote data comparators comprising 3-input AND gates. The input key is depressed when the data in the RAM is confirmed. For instance, when the input key 2a is depressed, a signal "1" is supplied to one of three inputs of the AND gate 19a, while a signal "0" is supplied when the input key 2a is released. Similarly, when the input key 2b is depressed, a signal "1" is supplied to one input of the AND of the AND gates 19b to 19g, while a signal "0" is supplied when the input key 2b is released.

The inverted data of the data in the RAM is supplied to the other one of the three inputs. For instance, assuming that the data in the RAM 13 is set to "0101111" in accordance with the order of the input keys 2a to 2g, a signal "1" is supplied to the AND gates 19a and 19c.

A pulse waveform to vibrate a piezoelectric buzzer or the like is supplied to the other remaining one input. The vibration is subsequently amplified by the amplifier 17 and a buzzer sound is generated from the speaker 7.

Figure 7:
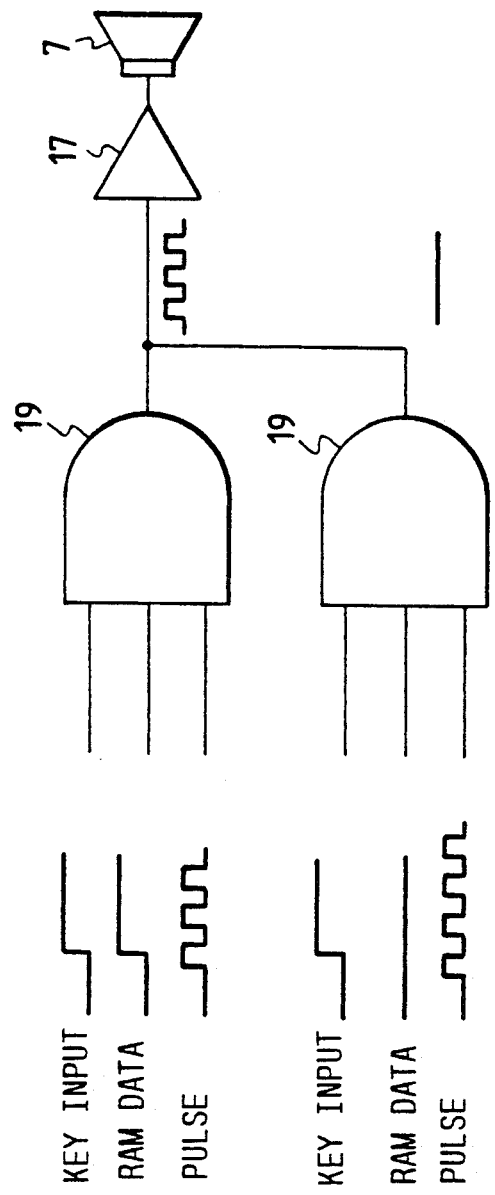
FIG. 7 is a block diagram showing a schematic construction of a data comparator in the construction shown in FIG. 6.

As mentioned above, by generating a sound such as a buzzer sound of "pee" in the case where the key input data coincides with the data which has already been stored in the RAM, the blind user can be informed of the coincidence of the data. FIG. 7 shows the relations between three inputs and the AND gates 19.

The operation in the above construction will now be described with reference to flowcharts of FIGS. 8 and 9.

Figure 8:
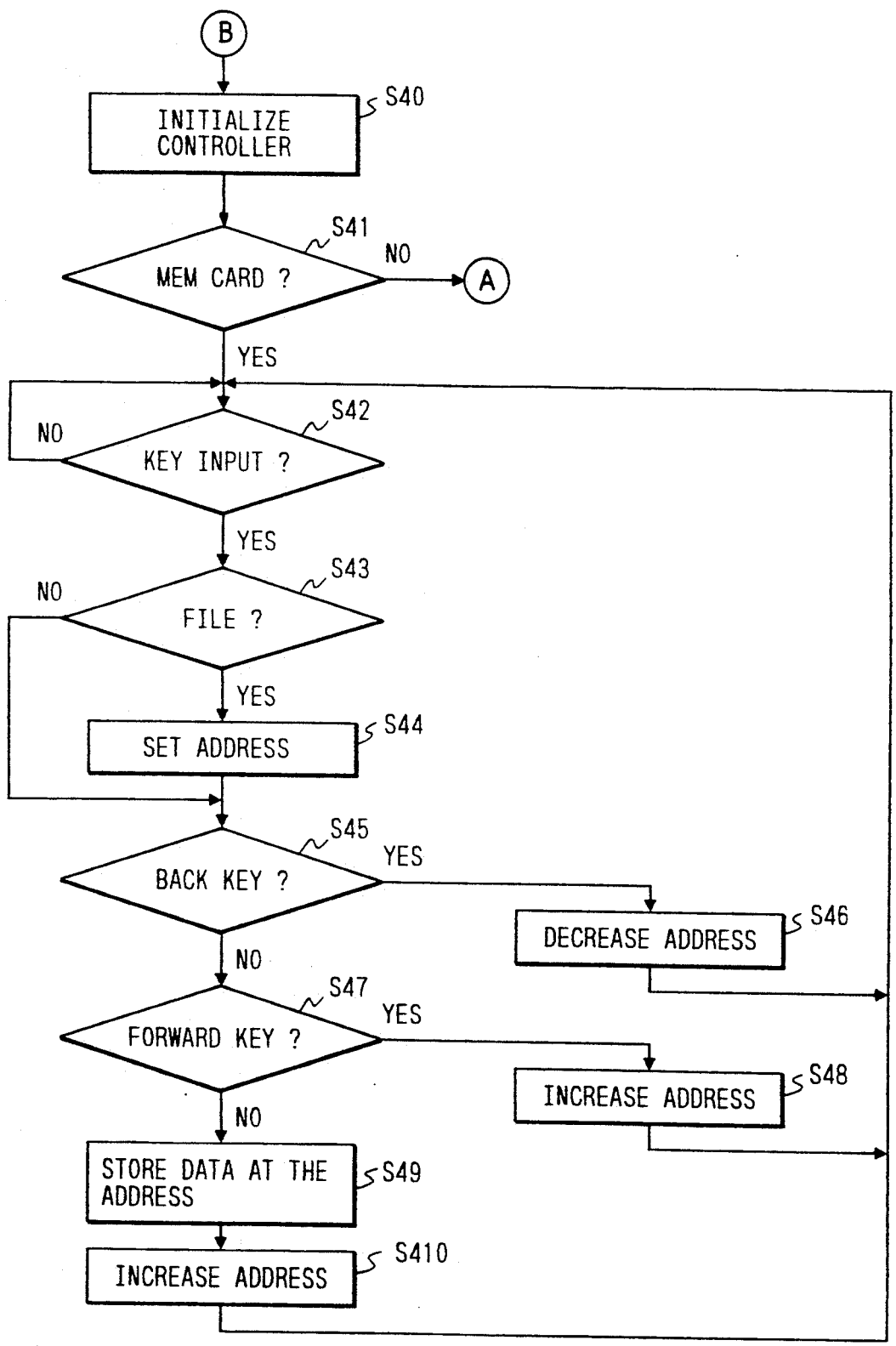
FIG. 8 is a flowchart showing a first control procedure in the construction shown in FIG. 6.

When the power source is turned on, the controller is first initialized in step S40 in FIG. 8 and, for example, a port is set and pulses to ring a buzzer are made. In step S41, a check is made to see if the memory mode has been set or not. If the memory mode has been set, the apparatus waits for a key input in step S42.

If a key input has been performed, a check is made in step S43 to see if the key input to set a file name has been performed or not by discriminating whether the space key 2g has simultaneously been depressed or not.

If the file name has been input, the address in the RAM 13 corresponding to the file name is set in step S44. The subsequent key input data is sequentially input from the above address. If the file name is not input in step S43, this means that the address has already been set, so that the processing routine advances to step S45.

In steps S45 and S47, checks are made to see if the back key 6b and the forward key 6a have been depressed or not. If the back key 6b and the forward key 6a have been depressed, the address is decreased in step S46 or is increased in step S48.

If the keys 6b and 6a are not depressed in steps S45 and S47, the key input data is stored into the relevant address in the RAM in step S49.

The address in the RAM is increased in step S410. Then, the processing routine is returned to the key input step S42 and similar processes are continued. The data is stored into the RAM.

Figure 9:
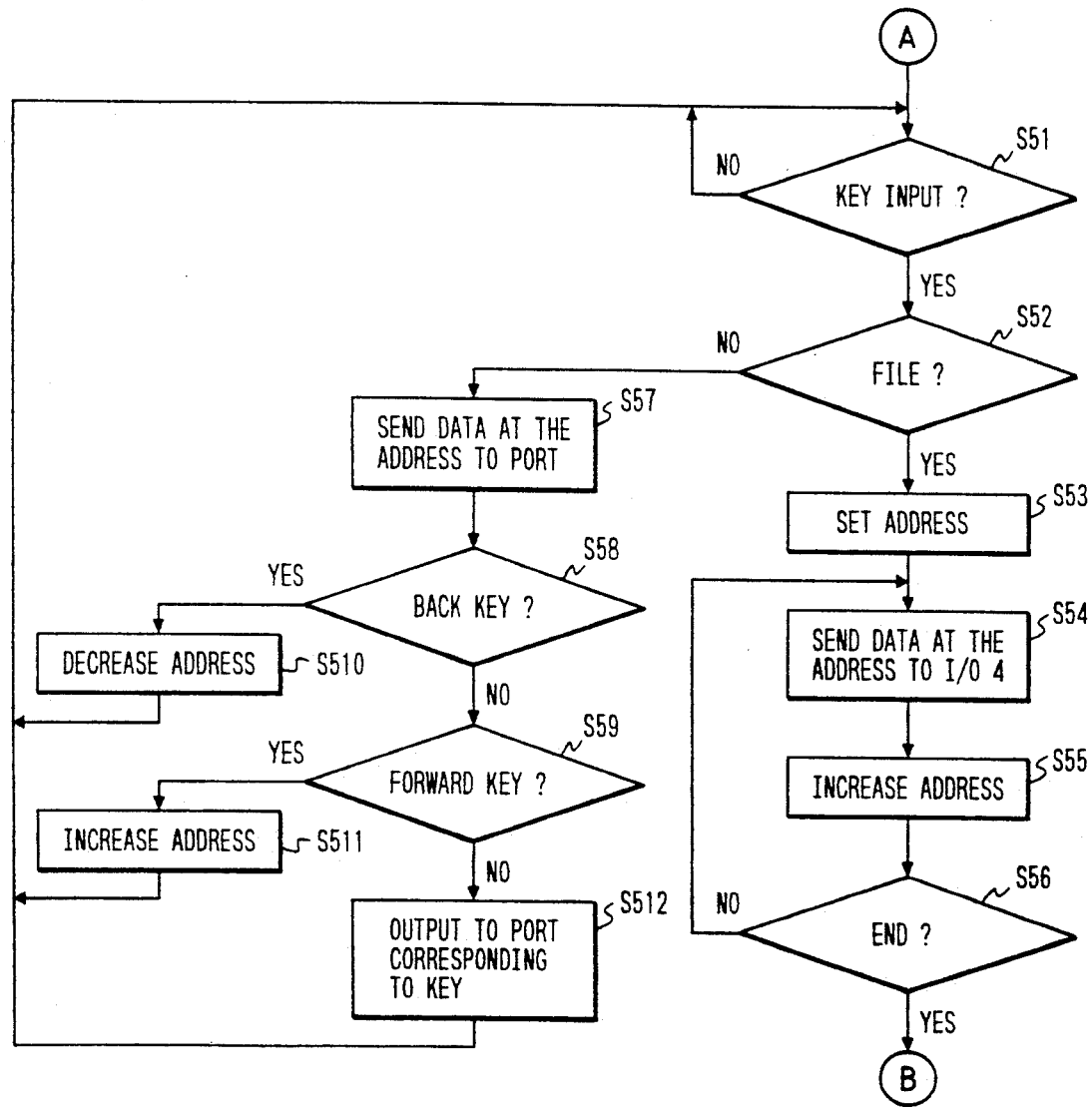
FIG. 9 is a flowchart showing a second control procedure in the construction shown in FIG. 6.

If the reading mode has been set in step S41, the processing routine advances to Ⓐ in FIG. 9. The apparatus waits for a key input in step S51. If the key input has been performed, a check is made in step S52 to see if the key input indicates a file name or not. If YES, the address corresponding to the file name is set in step S53. In step S54, the content of the RAM 13 is transmitted to the I/O interface 4. The address is increased in step S55.

A check is made in step S56 to see if the transmission has been finished or not. If YES, the processing routine advances Ⓑ to in FIG. 8. If the transmission is not finished yet in step S56, the processing routine is returned to step S54 and the processes in steps S54 and S55 are repeated until the data transmission is finished.

If the file name is not input in step S52, the content of the address in the RAM is supplied to the port in step S57. This output signal is input to the 3-input AND gates 19a to 19g in FIG. 7. In the next steps S58 and S59, checks are made to see if the back key 6b or the forward key 6a has been depressed or not. If either one of the back key 6b and the forward key 6a has been depressed, the address is decreased in step S510 or is increased in step S511.

If both of the keys 6a and 6b are not depressed in steps S58 and S59, in order to confirm the content of the RAM, a signal "1" is output to the port corresponding to the input key in step S512 and is supplied to another one of three ports of the 3-input AND gate.

Thus, a buzzer sound is generated from the speaker 7 when the data corresponding to the key input coincides with the content of the RAM.

As mentioned above, by providing means for comparing the input data stored in the memory means and the input data from the key input means, the data which is being input or edited can be confirmed without using a braille display and the electronic apparatus having an excellent portability can be provided.

That is, by providing means for informing the user of the data content by a sound output, there is no need to provide braille display means and the entire apparatus can be decreased in size and weight. The small electronic apparatus having a use efficiency similar to an electronic notebook which is used by a user of a normal eyesight can be provided.

Although the above embodiment has been described with respect to the construction in which the keys are input one by one when confirming the content of the RAM and a sound is generated when the key input data coincides, it is also possible to construct the apparatus in a manner such that a key input is executed on a six-bit unit basis and a sound is generated when the key input data coincides.

On the other hand, although the embodiment has been described with respect to the case of informing the user of the result of the confirmation by generating a buzzer sound, it can also in formed the user with a synthetic voice sound. The tone of the buzzer sound can be also freely changed by making a pulse width variable.

As will be obviously understood from the above description, according to the second embodiment of the invention, there are provided: key input means corresponding to each element of a predetermined braille pattern; the memory means for storing braille data which was input from the key input means; means for comparing the input data which was input from the key input means and the input data stored in the memory means; and means for generating the information indicative of the result of the comparison of the comparing means as sound data. Therefore, it is possible to provide an electronic apparatus having excellent portability and operability in which there is no need to provide braille output means and by comparing the braille data which is being input and the stored braille data, the result of the comparison can be confirmed by a sound output, and the apparatus can be reduced in size and weight.

We claim:

1. A voice output electronic apparatus whereby a user may input and confine braille data during an inputting operation comprising:
   key input means, corresponding to elements of a predetermined braille pattern, for inputting braille data by the user, wherein said kay input means rearranges a matrix of vertical and lateral points having an arrangement of the elements of the braille pattern in a predetermined direction;
   memory means for storing braille data input from said key input means by the user;
   means for comparing the input data input from said key input means by the same user during the inputting operation with input data previously stored in said memory means and input from said key input means by the user; and
   means for generating sound information indicative of the result of the comparison made by said comparing means,
   wherein said sound information generating means generates sound indicative of ON or OFF states of the keys having said rearranged order as time sequential binary data,
   wherein said sound information generating means synthesizes buzzer sounds of a short sound and a long sound or a high sound and a low sound in corresponding to "0" and "1" of binary data and generates time sequential sounds which are constructed by combining said buzzer sounds.

2. An apparatus according to claim 1, wherein said key input means rearranges a matrix of vertical and lateral points having an arrangement of the elements of the braille pattern in a predetermined direction, and memory means stores ON or OFF states of the keys having said rearranged order as time sequential binary data.

3. An apparatus according to claim 2, wherein said sound information generating means synthesizes buzzer sounds of a short sound and a long sound in correspondence to "0" and "1" of binary data and generates time sequential sounds which are constructed by combining the buzzer sounds.

4. An apparatus according to claim 1, wherein the sound information generating means generates a buzzer sound in the case where the result of the comparison by said comparing means indicates a coincidence between both of the input data.

* * * * *

UNITED STATES PATENT AND TRADEMARK OFFICE
CERTIFICATE OF CORRECTION

PATENT NO. : 5,154,614

DATED : October 13, 1992

INVENTOR(S) : MIKIHARU MATSUOKA, ET AL.

It is certified that error appears in the above-identified patent and that said Letters Patent is hereby corrected as shown below:

On the title page, Items:

[56] REFERENCES CITED

"Bornachoin" should read --Bornschein--.

[57] ABSTRACT

Line 7, "sound the" should read --the sound--.
Line 13, "being" should be deleted.

COLUMN 1

Line 17, "braille," should read --braille--.
Line 22, "processor. When" should read --processing, when--.
Line 23, "done" should read --done,--.

UNITED STATES PATENT AND TRADEMARK OFFICE
CERTIFICATE OF CORRECTION

PATENT NO. : 5,154,614
DATED : October 13, 1992
INVENTOR(S) : MIKIHARU MATSUOKA, ET AL.

It is certified that error appears in the above-identified patent and that said Letters Patent is hereby corrected as shown below:

COLUMN 2

Line 46, "an" should read --a--.

COLUMN 4

Line 53, "content of the" should be deleted.
    Line 54, "the" should read --the content of the--.

COLUMN 7

Line 42, "is formed" should read --inform--.

COLUMN 8

Line 9, "confine" should read --confirm--.
    Line 34, "corresponding" should read --correspondence--.
    Line 40, "and" should read --and said--.

Signed and Sealed this

Twenty-sixth Day of October, 1993

Attest:

BRUCE LEHMAN

*Attesting Officer*      *Commissioner of Patents and Trademarks*